May 12, 1925.  1,537,654
C. A. NASH
PROJECTING APPARATUS
Filed Jan. 2, 1923  3 Sheets-Sheet 1

Inventor:
Charles A. Nash,

May 12, 1925.

C. A. NASH 1,537,654

PROJECTING APPARATUS

Filed Jan. 2, 1923

3 Sheets-Sheet 2

Inventor:
Charles A. Nash,
By Dyrenforth, Lee, Chritton & Wiles,
Attys

May 12, 1925. 1,537,654

C. A. NASH

PROJECTING APPARATUS

Filed Jan. 2, 1923 3 Sheets-Sheet 3

Inventor:
Charles A. Nash,
By Dyrenforth, Lee, Chritton & Wiles,
Attys.

Patented May 12, 1925.

1,537,654

UNITED STATES PATENT OFFICE.

CHARLES A. NASH, OF CHICAGO, ILLINOIS.

PROJECTING APPARATUS.

Application filed January 2, 1923. Serial No. 610,318.

*To all whom it may concern:*

Be it known that I, CHARLES A. NASH, a citizen of the United States, residing at Chicago, in the county of Cook and State of Illinois, have invented a new and useful Improvement in Projecting Apparatus, of which the following is a specification.

This invention relates to improvements in projecting apparatus and more especially to an apparatus of that kind adapted for automatically displaying in succession the images of a series of slides suitably arranged within the device. My improved device is simple in construction and easy to operate. It is also so designed that it will run for long periods accurately and without attention. It is so constructed, also, that the mechanism is easily accessible, and the parts easily removable, thus assisting in making repairs or replacements. A device made in accordance with my invention will be found to run smoothly and quietly, displaying the various pictures steadily and in proper focus. Other features and advantages of my invention will appear more fully as I proceed with my specification.

Figure 1:
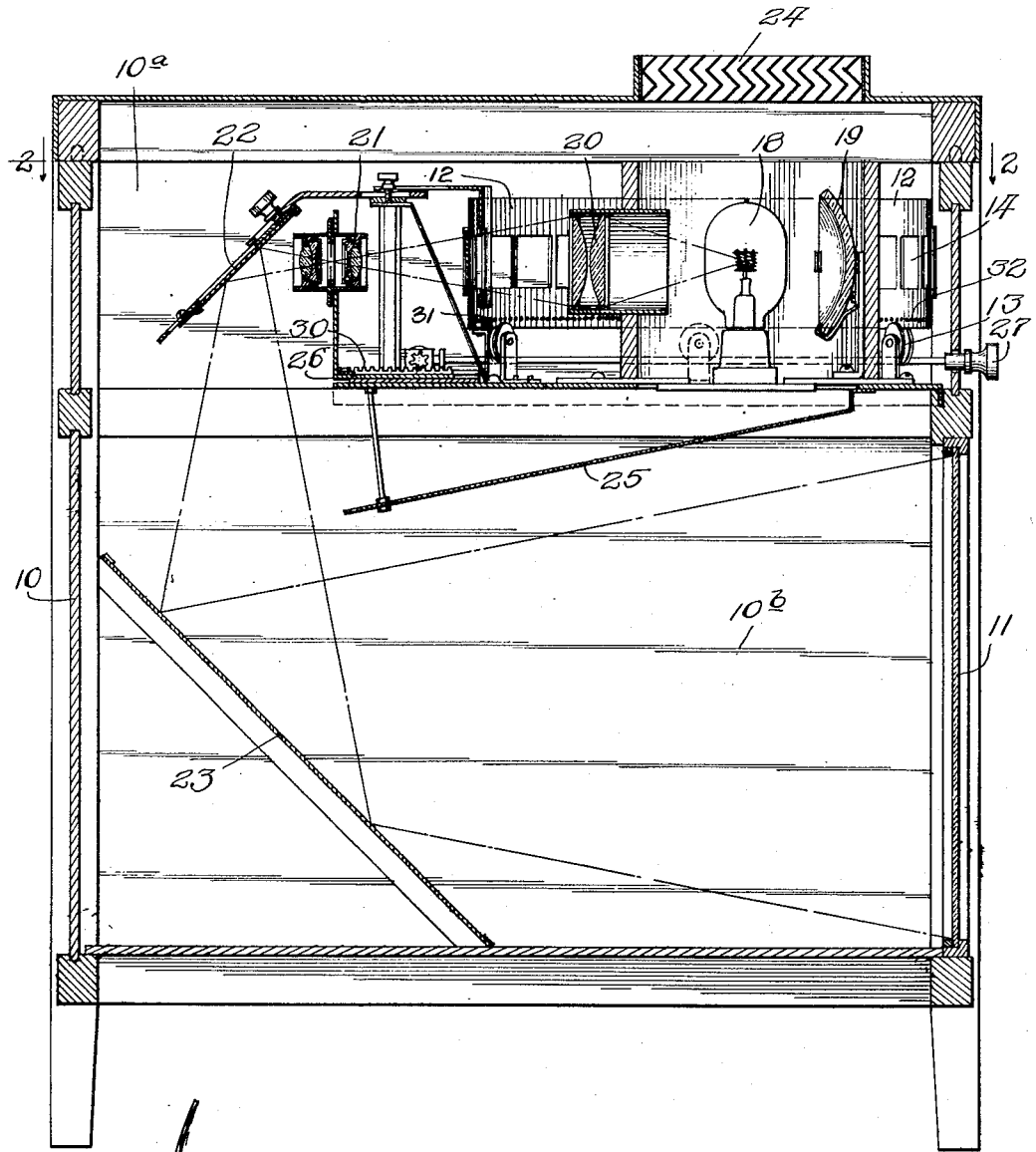
Figure 8:
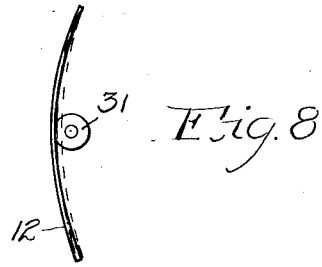
Figure 2:
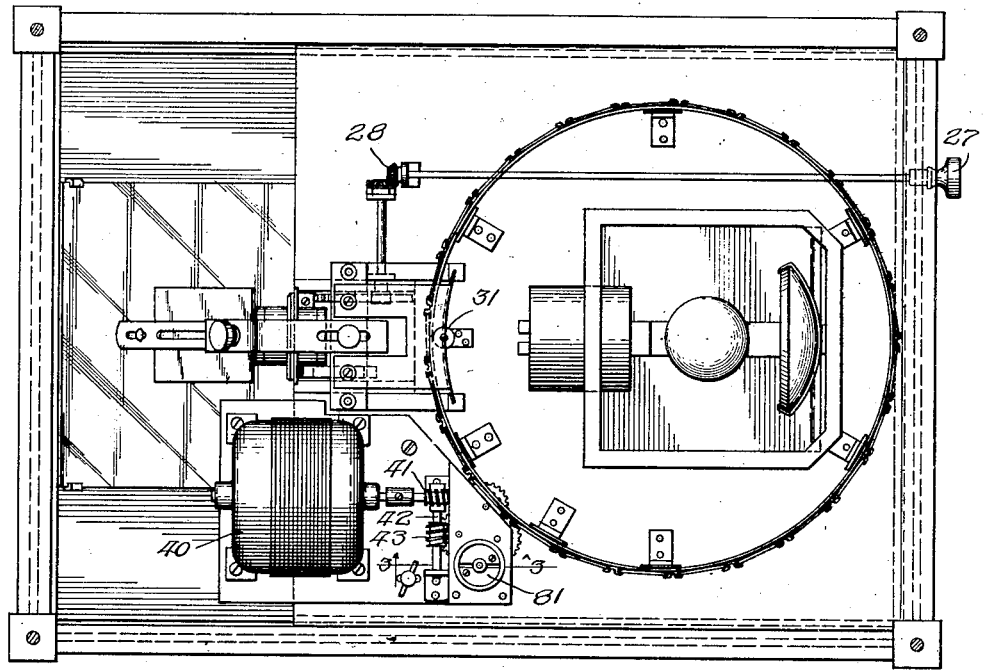
Figure 3:
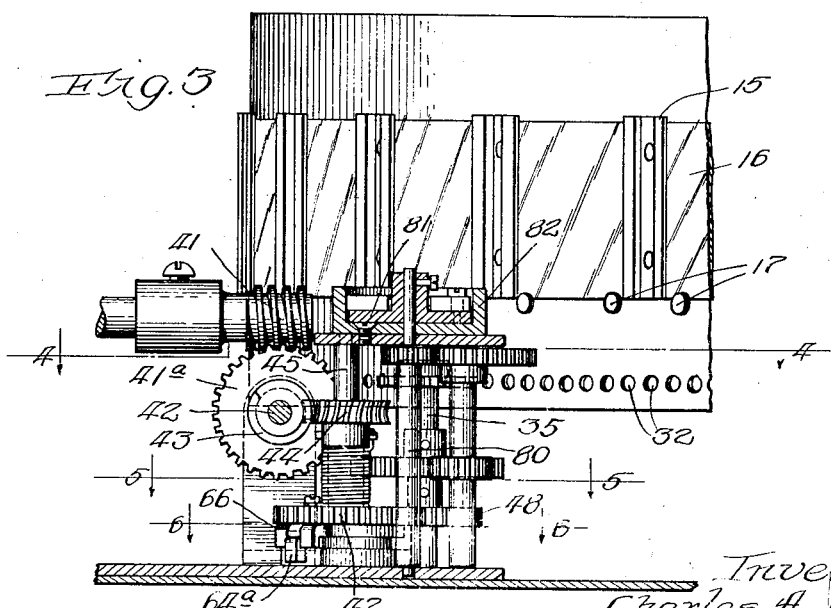
Figure 4:
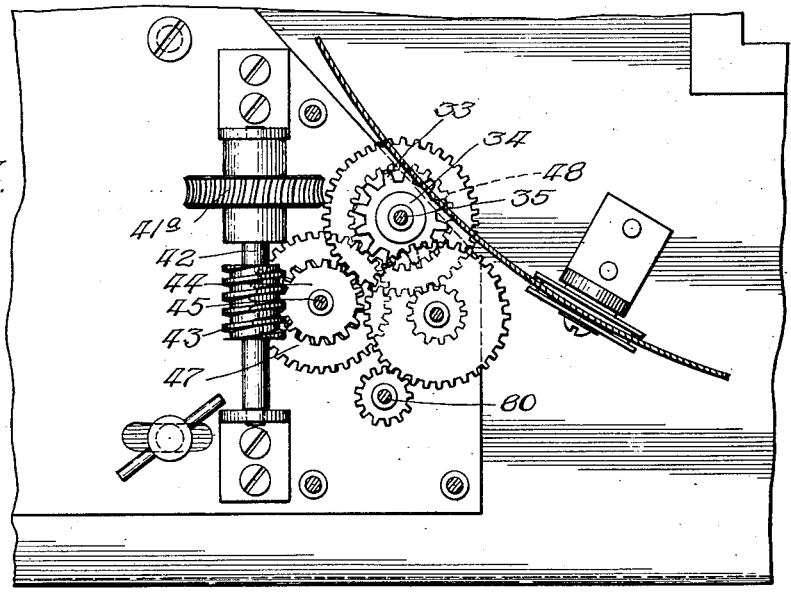
Figure 5:
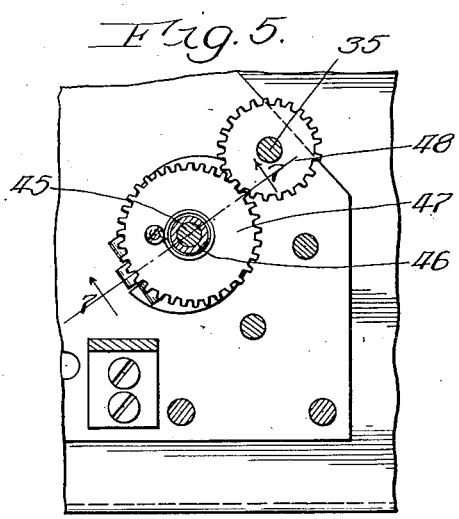
Figure 6:
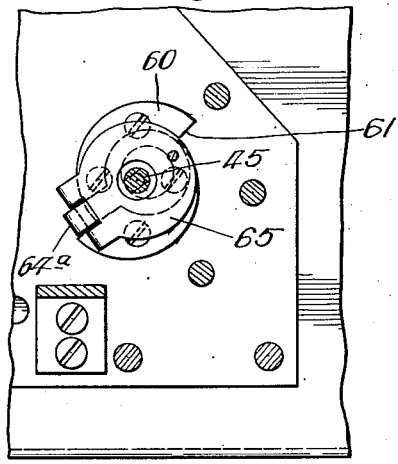
Figure 7:
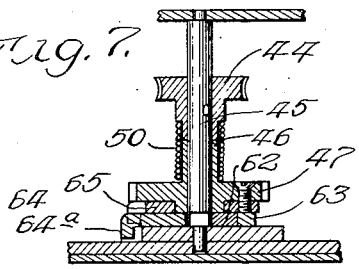

In that form of device embodying the features of my invention shown in the accompanying drawings, Fig. 1 is a vertical sectional view, Fig. 2 is a view taken as indicated by line 2 of Fig. 1, Fig. 3 is a view taken as indicated by the line 3 of Fig. 2, Fig. 4 is a view taken as indicated by the line 4 of Fig. 3, Fig. 5 is a view taken as indicated by the line 5 of Fig. 3, Fig. 6 is a view taken as indicated by the line 6 of Fig. 3, Fig. 7 is a view taken as indicated by the line 7 of Fig. 5, and Fig. 8 is a diagrammatic view showing the roller 31 in contact with the slide carrier 12.

As shown in the drawings, the device comprises a substantially rectangular cabinet or case 10, within which the mechanism is housed. The cabinet 10 has on the inside an upper and lower chamber $10^a$ and $10^b$, respectively, the upper chamber containing the projecting apparatus, and the lower chamber serving merely to conduct the light rays for displaying the image on the translucent screen 11 forming one wall of the lower chamber $10^b$.

The projecting apparatus comprises a cylindrical slide carrier 12 rotatably mounted on grooved rollers 13. The slide carrier 12 is preferably made out of a strip of sheet metal, bent into cylindrical form, and provided with rectangular openings 14, having at their side edges guides 15, adapted to retain the slides 16 in proper position with respect to the openings 14. Stops 17 are provided upon which the slide 16 may rest. It is obvious that any slide 16 may be easily removed from the top by merely sliding the same upwardly in the guides 15.

Arranged within the slide carrier 12 is a suitable source of light, such as an incandescent electric lamp 18. Back of this is a reflector 19 and in front of it a condenser 20, so that the light rays are properly directed through the slide in display position to the projecting lens apparatus 21. The emerging rays are reflected downwardly by means of a mirror 22, thence horizontally backwardly by means of a mirror 23 in the compartment $10^b$ to reflect the image on the screen 11.

Above the lamp 18 is arranged a ventilator 24 in order to permit circulation of air to cool the apparatus. There is also an opening between the compartments $10^a$ and $10^b$ below the lamp 18 to permit circulation of air; and this opening is screened by the plate 25, in order to shade the lower compartment $10^b$ from rays coming directly from the light 18.

The projection lenses 21 are mounted on a sliding carriage 26, which is adapted to be moved by turning the knob 27 which operates through the bevel gears 28 to rotate the pinion 29 operating on the rack 30 carried by the carriage 26. By sliding the lenses 21, the desired focus may be obtained.

A small roller 31 is provided, which contacts with the inside lower edge of the slide carrier 12 at a point directly under the slide which is in display position. This roller 31 is mounted forwardly far enough so that it will always be in contact with the slide carrier 12 and, in fact, hold the part of the slide carrier 12, with which it is in contact, slightly forward of the normal circle. In other words, it serves to spring the slide carrier 12 slightly out of its normal circular shape at the point of contact. The purpose of this construction is to insure the proper position of the slide being displayed. The slide carrier at this point, which is directly under the slide being displayed, will always be in contact with the roller 31, thus insuring always the same and proper position of the slide being displayed. This construction is shown in Fig. 8, where the normal cylindrical shape of the slide carrier 12 is shown in broken lines and the shape that it is caused to take by contact of the roller 31 is shown in solid lines.

Suitable means are provided for rotating the slide carrier 12 intermittently in order to display the slides carried thereby. I will now describe this mechanism in detail. The lower edge of the slide carrier 12 is provided with a series of perforations 32, adapted to be engaged by the teeth 33 of a pinion 34, mounted on the vertical shaft 35; so that rotation of this pinion will serve to rotate the slide carrier. Means are provided for intermittently rotating the pinion 34 a sufficient distance to move the slide carrier 12 the distance between the centers of two adjacent slides 16. Such means comprise a continuously rotating electric motor 40, driving a worm 41, operating a gear 41$^a$ on the shaft 42, which carries a worm 43. The worm 43 in turn drives a gear 44, mounted on the vertical shaft 45. The vertical shaft 45 has a sleeve 46, carrying a pinion 47, meshing with a pinion 48 on the shaft 35; so that rotation of the pinion 47 will cause rotation of the shaft 35 to rotate the gear 33 to move the slide carrier 12.

The following means are provided for causing the intermittent rotation. The sleeve 46, carrying the pinion 47, is rotatably mounted on the shaft 45; but the shaft 45 and the pinion 47 are connected by means of the spiral spring 50. This construction permits turning the shaft 45 while the pinion 47 is stationary, but such turning serves to wind up the spring 50. When the pinion 47 is released, the spring then serves to cause rotation thereof. In other words, the constantly rotating motor serves to constantly wind up the spring 50. This puts a constant pull on the pinion 47. Means are provided for preventing the pinion 47 from rotating except at intervals. A release mechanism is provided so that the pinion 47 is held stationary for a certain length of time and then released and allowed to rotate just far enough to move the slide carrier 12 the distance between the centers of two adjacent slides, in order to display a new picture.

The mechanism for thus holding the pinion 47 and then releasing the same is best shown in Figs. 5, 6 and 7. Mounted on the base is a cam plate 60 containing two diametrically arranged shoulders 61. Near the lower end of the shaft 45 it carries an eccentric wheel 62, surrounded by a strap 63. The strap 63 carries at one point a horizontal arm 64, carrying a downwardly extending finger or dog 64$^a$, adapted to engage the shoulders 61. Mounted on the underside of the pinion 47 is a plate 65, having a guide 66 in which operates the horizontal arm 64, carrying the dog 64$^a$. It will be seen that engagement of the dog 64$^a$ with one of the shoulders 61 will prevent rotation of the pinion 47; but that rotation of the shaft 45 operating through the eccentric 62 and eccentric strap 63 will cause sliding of the arm 64 in the guide 66, thus moving the dog 64$^a$ outwardly until it is freed from one of the shoulders 61. As soon as it is thus freed, the spring 50 will operate to rotate the pinion 47 until the dog 64$^a$ engages with the other shoulder 61. The gearing is so proportioned that rotation of the pinion 47 a distance of 180°, that is to move the dog 64$^a$ from one shoulder 61 to the other, will operate to move the slide carrier 12 a sufficient distance to remove one of the slides from the display position and place the next adjacent slide in such position.

Means are also provided for preventing too fast rotation of the mechanism. Such means comprise a centrifugal governor mounted on the vertical shaft 80 driven by a chain of gearing from the shaft 35. This shaft 80 carries at its upper end two semicircular pivoted arms 81, adapted to swing outwardly by centrifugal force upon rotation to cause their frictional engagement with the circular rim 82.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent is:—

1. In a device of the character described, a flexible cylindrical slide carrier rotatably mounted, and a roller immovably mounted with respect to the slide carrier and in contact with its inner side at a point close to the slide in display position, the periphery of said roller where in contact with the slide carrier lying outside of the normal circular shape of said slide carrier, whereby said slide carrier where in contact with said roller is pressed slightly out of its normal cylindrical shape.

2. In a device of the character described, a flexible cylindrical slide carrier rotatably mounted, and a roller immovably mounted with respect to the slide carrier and in contact with one side of said slide carrier at a point close to the slide in display position, the periphery of said roller where in contact with the slide carrier lying to one side of the normal circular shape of said slide carrier, whereby said slide carrier where in contact with said roller is pressed slightly out of its normal cylindrical shape.

3. A device of the character described comprising projecting apparatus, a slide carrier, and means for intermittently moving said slide carrier to move the slides carried thereby successively into display position, said moving mechanism comprising a continuously rotating member, and an intermittently rotating member, a spring connecting said members, and means for alternately holding said intermittently rotating member against rotation and then releasing the same.

4. A device of the character described comprising projecting apparatus, a slide carrier, and means for intermittently moving said slide carrier to move the slides carried thereby successively into display position, said moving mechanism comprising a continuously rotating member, and an intermittently rotating member, a spring connecting said members, and means for alternately holding said intermittently rotating member against rotation and then releasing the same, said holding and releasing means operated by said continuously rotating member.

5. A device of the character described comprising; projecting apparatus; a rotatable slide carrier; and means for intermittently moving said slide carrier to move the slides carried thereby successively into display position, said moving mechanism comprising an intermittently rotating member geared to the rotatable slide carrier, a continuously rotating member, a spring connecting said members, and means for alternately holding said intermittently rotating member against rotation and then releasing the same.

6. A device of the character described comprising; projecting apparatus; a rotatable slide carrier; drag means for preventing too fast rotation of the slide carrier; and means for intermittently moving said slide carrier to move the slides carried thereby successively into display position, said moving mechanism comprising an intermittently rotating member geared to the rotatable slide carrier, a continuously rotating member, a spring connecting said members, and means for alternately holding said intermittently rotating member against rotation and then releasing the same.

7. A device of the character described comprising; projecting apparatus; a rotatable slide carrier; and means for intermittently moving said slide carrier to move the slides carried thereby successively into display position, said moving mechanism comprising an intermittently rotating member geared to the slide carrier, a continuously rotating member, a spring connecting said members, and means for alternately holding said intermittently rotating member against rotation and then releasing the same, said holding means comprising a cam wheel with a shoulder, a dog connected to the intermittently rotating member adapted to engage said shoulder to hold said member against rotation, and means for disengaging said dog from said shoulder to permit rotation of the intermittently rotating member.

8. A device of the character described comprising; projecting apparatus; a rotatable slide carrier; and means for intermittently moving said slide carrier to move the slides carried thereby successively into display position, said moving mechanism comprising an intermittently rotating member geared to the slide carrier, a continuously rotating member, a spring connecting said members, and means for alternately holding said intermittently rotating member against rotation and then releasing the same, said holding means comprising a cam wheel with a shoulder, a dog connected to the intermittently rotating member adapted to engage said shoulder to hold said member against rotation, and means operated by the continuously rotating member for disengaging said dog from said shoulder to permit rotation of the intermittently rotating member.

9. A device of the character described comprising; projecting apparatus; a rotatable slide carrier; and means for intermittently moving said slide carrier to move the slides carried thereby successively into display position, said moving mechanism comprising an intermittently rotating member geared to the slide carrier, a continuously rotating member, a spring connecting said members, and means for alternately holding said intermittently rotating member against rotation and then releasing the same, said holding means comprising a cam wheel with a shoulder, a dog connected to the intermittently rotating member adapted to engage said shoulder to hold said member against rotation, said dog connected to the spring connecting the continuously rotating member and the intermittently rotating member, whereby tightening of said spring will cause said dog to be released from said shoulder to permit rotation of the intermittently rotating member and consequent loosening of the spring.

Witness my hand and seal this 29 day of December, 1922.

CHARLES A. NASH. [L. S.]